(12) United States Patent
Bookheimer et al.

(10) Patent No.: US 11,148,213 B2
(45) Date of Patent: Oct. 19, 2021

(54) HARDWARE FASTENER WITH MOVABLE THREADED ELEMENT AND ONE OR MORE SPRING-LIKE MEMBERS

(71) Applicant: Kennametal Inc., Latrobe, PA (US)

(72) Inventors: Alan J. Bookheimer, Greensboro, PA (US); Ruy Frota de Souza Filho, Latrobe, PA (US); Jason Won Goldsmith, Greensburg, PA (US); Jeremy P. Canonge, Pittsburgh, PA (US)

(73) Assignee: KENNAMETAL INC., Latrobe, PA (US)

( * ) Notice: Subject to any disclaimer, the term of this patent is extended or adjusted under 35 U.S.C. 154(b) by 320 days.

(21) Appl. No.: 16/239,094

(22) Filed: Jan. 3, 2019

(65) Prior Publication Data
US 2020/0215627 A1 Jul. 9, 2020

(51) Int. Cl.
  *B23C 5/08* (2006.01)
  *B23C 5/22* (2006.01)
  *B23C 5/00* (2006.01)

(52) U.S. Cl.
  CPC ............ *B23C 5/2226* (2013.01); *B23C 5/006* (2013.01); *B23C 5/08* (2013.01)

(58) Field of Classification Search
  CPC .......... B23C 2210/161; B23C 2260/84; B23C 2210/168; B23C 5/006; B23C 5/08; B23C 5/2208; B23C 5/2226
  See application file for complete search history.

(56) References Cited

U.S. PATENT DOCUMENTS

| 2,577,810 | A |   | 12/1951 | Rosan |
| 3,566,947 | A |   | 3/1971 | Jukes |
| 3,798,724 | A | * | 3/1974 | Czopor ................ B23C 5/2462 407/93 |
| 3,802,043 | A | * | 4/1974 | Garih .................... B23C 5/2444 407/36 |
| 4,353,264 | A |   | 10/1982 | Erikson et al. |
| 5,454,667 | A | * | 10/1995 | Cirino ................. B23B 29/0341 408/153 |

(Continued)

FOREIGN PATENT DOCUMENTS

| DE | 2163842 A1 * | 6/1973 | ........... B23C 5/2472 |
| EP | 2933046 A1 * | 10/2015 | ........... B23C 5/2468 |

(Continued)

*Primary Examiner* — Sara Addisu
(74) *Attorney, Agent, or Firm* — Larry R. Meenan

(57) ABSTRACT

A hardware fastener with a movable threaded element suspended within a cavity formed in a body. The movable threaded element has an internal surface with threads for cooperating with a threaded fastener. The movable threaded element is suspended in the cavity by the one or more spring-like members such that an area, A, of reduced stiffness is created in the cavity proximate the movable threaded element, thereby allowing the movable threaded element to move a predetermined distance within the cavity when torque is applied to the threaded fastener. The one or more spring-like members store elastic potential energy to prevent the loss of pretension of the threaded fastener that can be caused by heat or vibration. The invention also eliminates the need for a torque wrench when tightening the threaded fastener to a specified torque value.

15 Claims, 9 Drawing Sheets

(56) References Cited

U.S. PATENT DOCUMENTS

| | | | |
|---|---|---|---|
| 6,240,798 | B1 | 6/2001 | Erikson et al. |
| 8,262,323 | B2 * | 9/2012 | Satran ..................... B23C 5/06 |
| | | | 407/41 |
| 10,384,279 | B2 * | 8/2019 | Saji .......................... B23C 9/00 |
| 2004/0155465 | A1 | 8/2004 | Noel et al. |
| 2007/0258789 | A1 | 11/2007 | Bogue |
| 2009/0116929 | A1 | 5/2009 | Shea et al. |
| 2010/0247266 | A1 | 9/2010 | Staniszewski |
| 2013/0326860 | A1 | 12/2013 | Endt et al. |
| 2018/0297123 | A1 * | 10/2018 | Harif ................. B23B 27/1662 |

FOREIGN PATENT DOCUMENTS

| | | | | |
|---|---|---|---|---|
| EP | 2933047 A1 * | 10/2015 | ........... | B23C 5/2221 |
| WO | WO-2007139483 A1 * | 12/2007 | ........... | B23C 5/2413 |

* cited by examiner

HARDWARE FASTENER WITH MOVABLE THREADED ELEMENT AND ONE OR MORE SPRING-LIKE MEMBERS

FIELD OF THE INVENTION

The invention relates in general to hardware fasteners with mating internal-external threads, and in particular to a movable element with internal threads disposed within a cavity with one or more spring-like members to create an area of reduced stiffness proximate the movable element. The area of reduced stiffness allows for axial and/or angular elastic displacement when torque is applied to a threaded fastener.

BACKGROUND OF THE INVENTION

One type of rotary tool is a modular rotary tool with two coupling parts; namely, a tool body and a cutting insert mounted on the tool body. The cutting insert is mounted on the tool body using a screw or bolt. It has been found that the screw or bolt may lose pretension that may be caused by heat or small rotations of the screw/bolt caused by vibration curing a metal cutting operation. This loss of pretension of the threaded fastener can allow the cutting insert to become loose during the metal cutting operation.

SUMMARY OF THE INVENTION

Embodiments of the invention are directed to provide a means to store elastic potential energy to prevent the loss of screw/bolt pretension that can be caused by heat induced into a threaded connection or small rotation caused by vibration. Another problem addressed by the invention is removing the need for a torque wrench when tightening a screw or bolt to a specified torque value.

In general, the invention is directed to an internally threaded movable element that is surrounded by an area with decreased stiffness, allowing the internally threaded movable element to move axially and/or angularly, while torque is applied to a threaded fastener, such as a screw, bolt, and the like. This movement could eventually close a gap of a predetermined thickness when the torque on the thread reaches a specific value.

In one aspect of the invention, a hardware fastener comprises a movable threaded element suspended in a cavity of a body by one or more spring-like members to create an area, A, of reduced stiffness in the cavity, thereby allowing the movable threaded element to move a predetermined distance relative to the body within the cavity when torque is applied to a threaded fastener, thereby placing the threaded fastener under pretension.

In another aspect of the invention, a cutting tool includes a body with one or more of insert-receiving pockets formed in the body. The one or more insert-receiving pockets includes a cavity. A hardware fastener comprising a movable threaded element is suspended within the cavity by one or more spring-like members extending from an exterior surface of the movable threaded element. The movable threaded element has an internal surface with threads for cooperating with a threaded stem portion of a threaded fastener, and an external surface with one or more spring-like members extending therefrom. The threaded member is suspended in the cavity by the one or more spring-like members such that an area, A, of reduced stiffness is created in the cavity proximate the movable threaded element, thereby allowing the movable threaded element to move a predetermined distance within the cavity when torque is applied to the threaded fastener.

These and other aspects of the present invention will be more fully understood following a review of this specification and drawings.

BRIEF DESCRIPTION OF THE DRAWINGS

While various embodiments of the invention are illustrated, the embodiments shown should not be construed to limit the claims. It is anticipated that various changes and modifications may be made without departing from the scope of this invention.

DETAILED DESCRIPTION OF THE INVENTION

Figure 1:
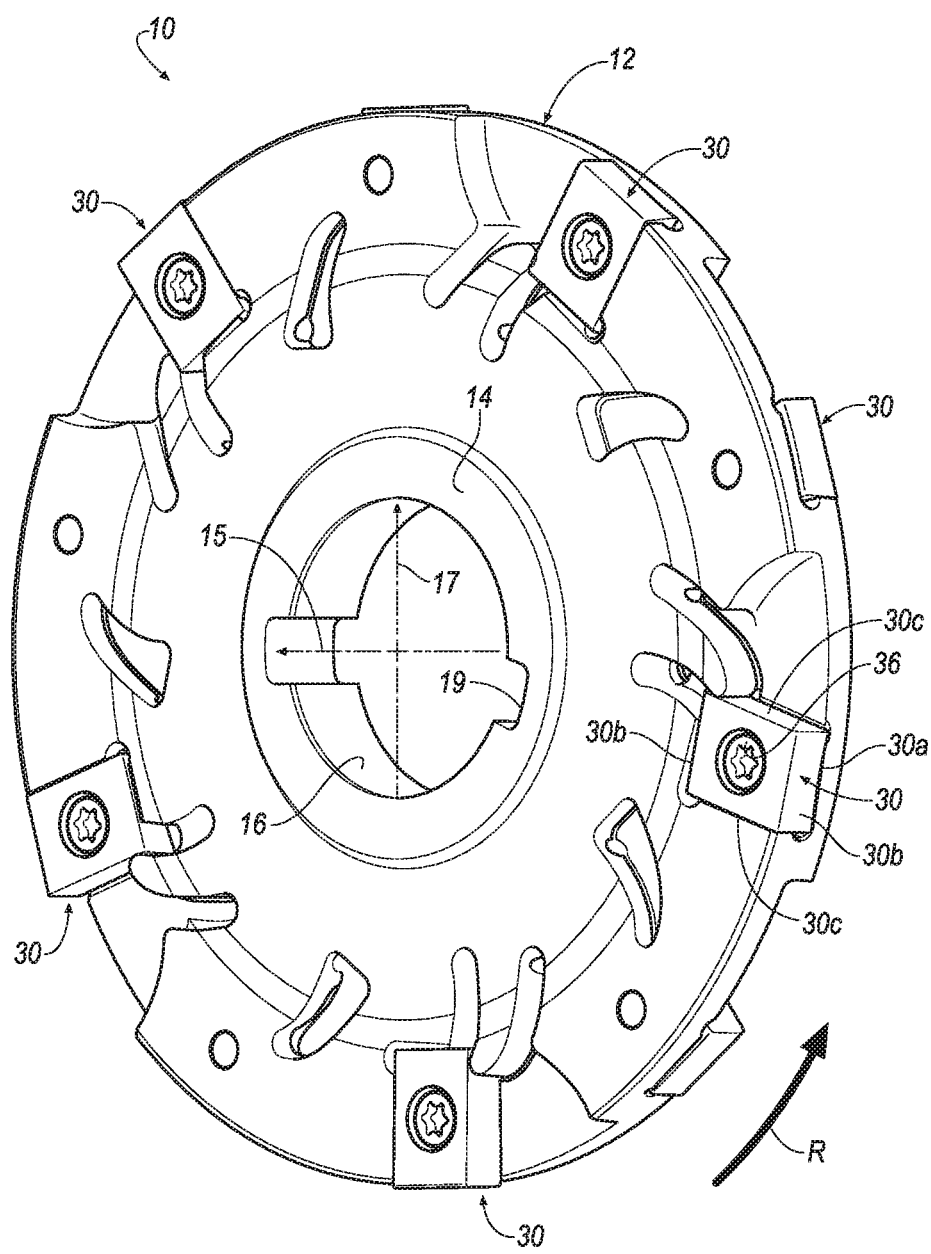
FIG. 1 is a perspective view of a cutting tool, for example, a slotting cutter with a hardware fastener according to an embodiment of the invention.
Figure 2:
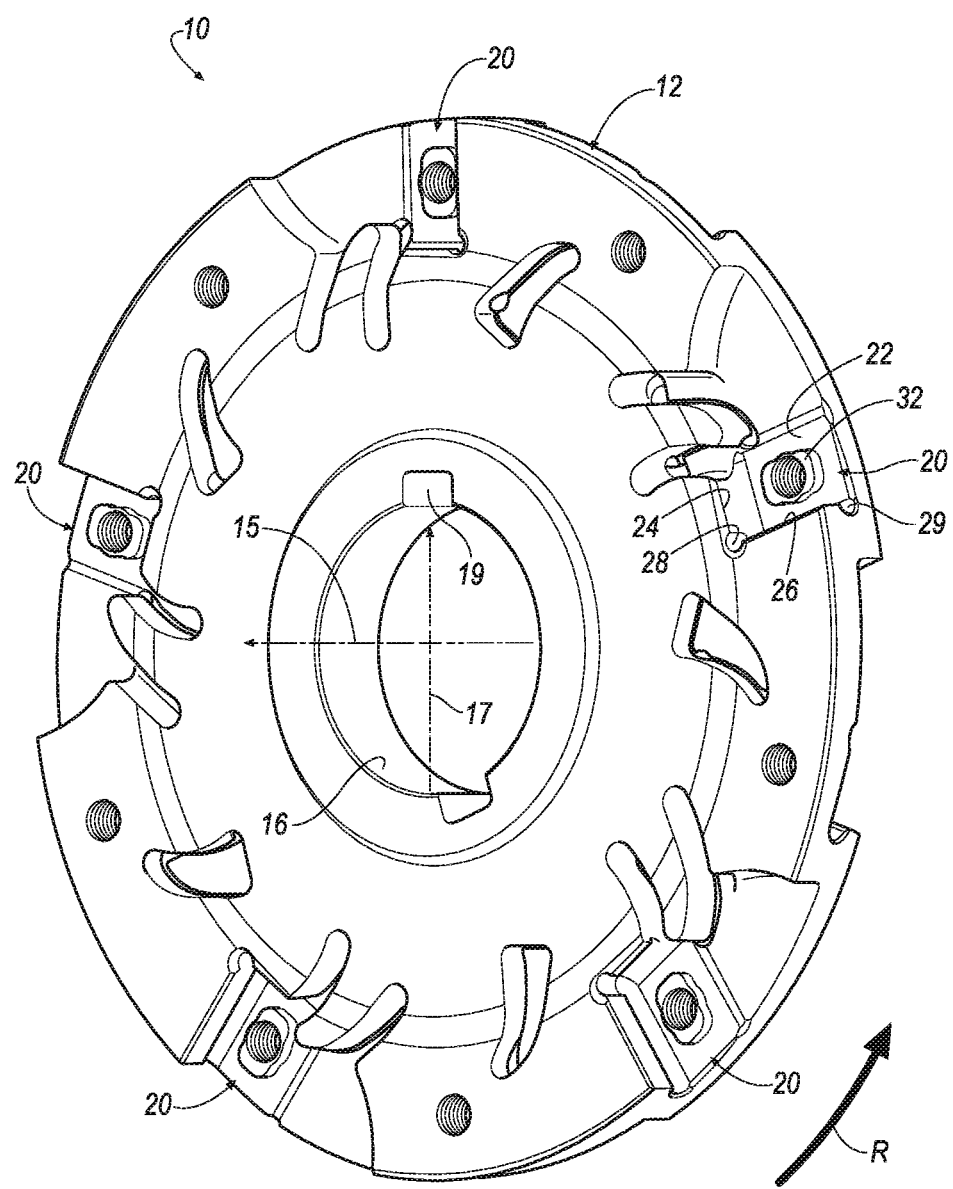
FIG. 2 is a perspective view of the slotting cutter of FIG. 1 with the cutting inserts and the hardware fasteners removed to show the movable threaded element with spring-like members of the invention.

Referring now to FIGS. 1 and 2, a cutting tool 10 is shown according to an embodiment of the invention. In the illustrated embodiment, the cutting tool 10 comprises a slotting cutter including a disc-like cutter body 12 having a central hub region 14 that is provided with a cavity 16 for receiving a support shaft (not shown). However, the principles of the invention can be applied to any threaded assembly, especially a threaded assembly having short threaded fasteners exposed to vibrations and/or temperature fluctuations. In the illustrated example, the cutting tool comprises a slotting cutter. However, the type of cutting tool described herein is for illustration purposes only, and the cutting tool can be any type of cutting tool, such as a milling tool, a reamer, a tap, a turning tool, or another type of tool with a hardware fastener.

The slotting cutter 10 rotates on a central axis 15 perpendicular to a plane 17 of the cutter body 12 in a predetermined direction (indicated by the arrow R). The central hub region 14 may also be provided with an optional keyway 19 for receiving a drive key (not shown).

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

In the illustrated embodiment, the slotting cutter 10 includes one or more insert-receiving pockets 20 formed at predetermined location about the cutter body 12 for receiving a cutting insert 30. In the illustrated embodiment, the slotting cutter 10 includes ten insert-receiving pockets 20 formed about the periphery of the cutter body 12 at equally spaced intervals. However, it will be appreciated that the invention is not limited by the number of insert-receiving pockets 20, and that any suitable number of pockets 20 may be formed about the cutter body 12, depending on the desired material of the work piece to be cut and the physical dimensions of the cutter body 12.

Figure 4:
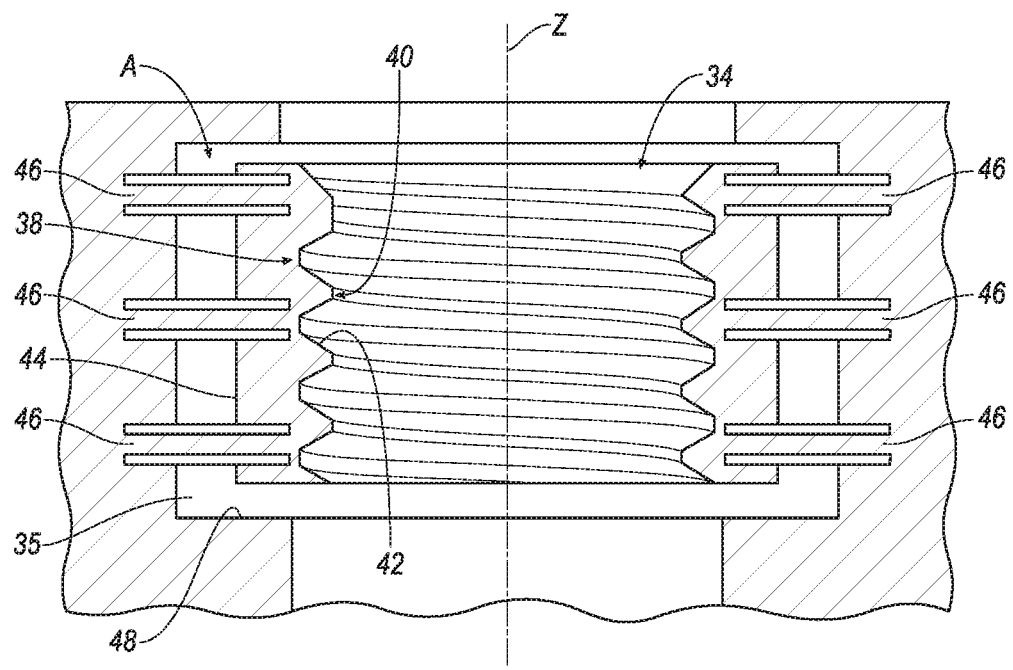
FIG. 4 is an enlarged, side view of the hardware fastener with the movable threaded element and the spring-like members of FIG. 3.

Each insert-receiving pocket 20 includes a bottom support surface 22, a radial support surface 24, and an axial support surface 26. The insert-receiving pocket 20 may also include a corner relief 28 between the radial support surface 24 and the axial support surface 26, and a corner relief 29 between the bottom support surface 22 and the axial support surface 26 (FIG. 4). In one embodiment, the radial support surface 24 is substantially perpendicular to the axial support surface 26. However, it will be appreciated that the invention is not limited by the relative angle between the radial and axial support surfaces 24, 26, and that the invention can be practiced with the radial and axial support surfaces 24, 26 being non-perpendicular to each other.

As shown in FIG. 1, a cutting insert 30 is tangentially mounted in each insert-receiving pocket 20 of the cutter body 12. As shown in FIG. 2, the bottom support surface 22 may include a central raised portion 32 that cooperates with a complimentary-shaped recess (not shown) in the cutting insert 30 for assisting in properly locating the cutting insert 30 in the pocket 20. It should be noted that the central raised portion 32 is optional and can be omitted. In this case, the cutting insert 30 need not have a complementary-shaped recess, and the cutting insert 30 can be indexable by flipping the cutting insert such that the bottom surface 30a of the cutting insert 30 becomes the top surface.

When the cutting insert 30 is properly mounted in the pocket 20, the bottom support surface 22 of the pocket 20 contacts the bottom surface 30a of the cutting insert 30. In addition, the radial support surface 24 of the pocket 20 contacts one of the peripheral side surfaces 30b of the cutting insert 30, and the axial support surface 26 contacts another one of the peripheral side surfaces 30c of the cutting insert 30, thereby providing three-point contact when the cutting insert 30 is mounted in the pocket 20. The bottom support surface 22 of the pocket 20 is complementary in shape to the bottom surface 30a of the cutting insert 30, while the side surfaces 30b, 30c of the cutting insert 30 are complementary in shape to the radial and axial support surfaces 24, 26 of the pocket 20, respectively.

In the illustrated embodiment, the cutting insert 30 is a single-sided cutting insert with four cutting edges (i.e. two right-handed cutting edges 180 degrees apart, and two left-handed cutting edges 180 degrees apart) that can be selectively presented to a working position by unthreading a threaded fastener 36, such as a mounting screw, and the like, from the cutting insert 30 until the cutting insert 30 is able to be removed from the insert-receiving pocket 20, removing the cutting insert 30, and rotating the cutting insert 180 degrees about a vertical axis, and then again mounting the cutting insert 30 in the cutter body 12. In the illustrated embodiment, the cutting insert 30 can be mounted on the opposite side of the cutting tool 10 to present the two left-handed cutting edges if the two right-handed cutting edges were already presented to the workpiece, and vice versa.

Referring now to FIGS. 1-5, one aspect of the invention is that the pocket 20 includes a hardware fastener 34 comprising a movable threaded element 38 suspended within a cavity 35 formed in the pocket 20 by one or more spring-like members 46. The movable threaded element 38 is capable of receiving the threaded fastener 36 for mounting the cutting insert 30 in the pocket 20. The movable threaded element 38 and one or more spring-like elements 46 of the invention can have a variety of different configurations, which will now be described in more detail. As known in the art, the mounting screw has a head portion 36*a* and a threaded stem portion 36*b*.

In general, the movable threaded element 38 has an internal surface 40 with threads 42 for cooperating with the threaded stem portion 36*b* of the mounting screw 36. The movable threaded element 38 also has an external surface 44 with one or more spring-like members 46 extending therefrom. The one or more spring-like members 46 suspend the movable threaded element 38 in a cavity 35 to create an area of reduced stiffness, A, in the cavity 35 proximate the movable threaded element 38. In the illustrated embodiment, the one or more spring-like members 46 extend radially outward from the movable threaded element 38 to act like a cantilever having a predetermined amount of flexure. In this manner, the one or more spring-like members 46 act as a spring, i.e., a linear flex-spring of a cantilever type having a fulcrum that is located approximately midway along each spring-like member 46. In the illustrated embodiment, the movable threaded element 38 is generally tubular in shape. However, it will be appreciated that the movable threaded element 38 can have any desirable shape, so long as it can be suspended in the cavity 35.

The movable threaded element 38 and the spring-like members 46 can be made of the same material as the cutting tool body 12, or the movable threaded element 38 can be made of a different material than the cutting tool body 12 and the spring-like members 46. For example, the cutting tool body 12 and the movable threaded element 38 can be made of tool steel. In another example, the cutting tool body 12 can be made of tool steel, and the movable threaded element 38 and the spring-like members 46 can be made of a different material, such as aluminum, plastic, and the like. It should be understood that selecting different materials for the cutting tool body 12 and the movable threaded element 38 and the spring-like members 46 can be any desirable material to satisfy a specific design requirement, for example, to vary the relative stiffness therebetween.

One method of producing such an arrangement is by using a 3-D printing technique. Using a 3-D printing technique allows the movable threaded element 38 and spring like members 46 of the hardware fastener 34 to be integrally-formed with the cutting tool 10, thereby minimizing manufacturing complexity and eliminating assembly issues, such as tolerance stack up and backlash, of the cutting tool 10.

Figure 3:
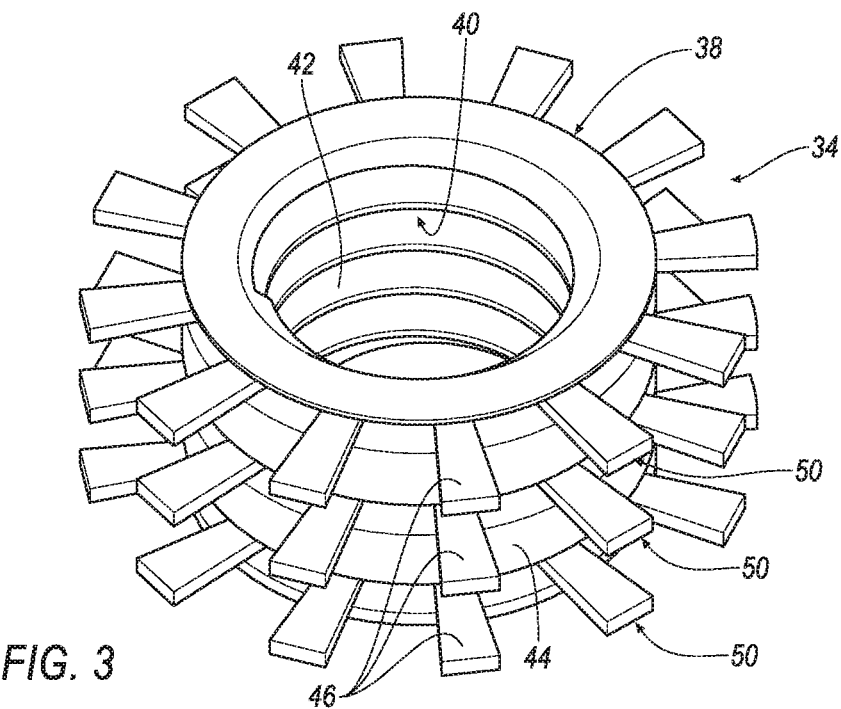
FIG. 3 is an enlarged, isometric top view of a hardware fastener with a movable threaded element and spring-like members that act as a cantilever according to an embodiment of the invention.

As shown in FIGS. 3 and 4, the movable threaded element 38 has one or more rows 50 of equally-spaced spring-like members 46 extending radially outward from the external surface 44, each row containing one or more spring-like elements 46. In the illustrated embodiment, the movable threaded element 38 is connected to the wall 48 of the cavity 35 by three rows 50 of spring like elements 46, each row 50 having twelve equally-spaced spring-like members 46. However, it will be appreciated that the invention is not limited by the number of spring-like members 46 in each row 50, and that the invention can be practiced with any desirable number of spring-like members in each row, depending on design requirements. It will also be appreciated that the invention is not limited by the number of rows of spring-like members, and that the invention can be practiced with any desirable number or rows, depending on design requirements. It will also be appreciated that the invention is not limited to equally spaced rows 50 of spring like elements 46. As well, the invention is also not limited to equal spacing between the spring-like members 46 in each row 50. For example, the spring-like members 46 can be only located in areas requiring a higher concentration in areas where higher stiffness is needed. The arrangement of the spring-like members 46 does not need to be periodic, evenly distributed or follow a specific pattern. In addition, the spring-like members 46 need not have the same shape and may have different shapes to provide the desired stiffness in a specific area proximate the movable threaded element 38.

In the illustrated embodiment, each spring-like member 46 of one row 50 is vertically aligned with a respective spring-like member 46 of a different row 50. However, it will be appreciated that each spring-like member 46 of one row 50 can be non-aligned or staggered with respect to a spring-like member 46 from a different row 50.

One advantage of the invention is that the movable threaded element 38 can be designed to move a predetermined distance in the direction of the vertical axis, Z, (i.e., axial direction) when torque is applied to the mounting screw 36, thereby eliminating the need of using a torque wrench when mounting the cutting insert 30 in the pocket 20. The movable threaded element 38 can move the predetermined distance in the axial direction relative to the insert-receiving pocket 20 because the movable threaded element 38 is suspended in the cavity 35 by the one or more spring-like members 46.

Figure 5:
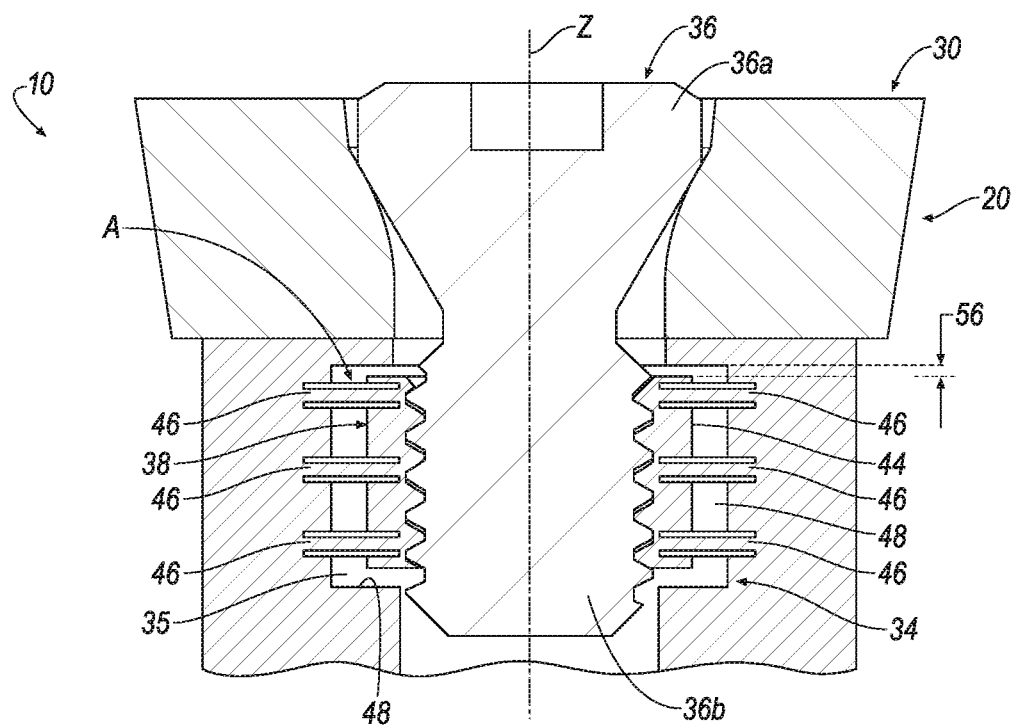
FIG. 5 is a side, cross-sectional view of the movable threaded element with spring-like members of FIG. 3 when in a relaxed or non-tightened condition.

FIG. 5 shows the hardware fastener 34 in a loose or non-tightened condition. In this condition, the cutting insert 30 is not yet securely mounted in the pocket 20 of the slotting cutter 10 and the spring-like members 46 of the movable threaded element 38 are substantially perpendicular to the vertical axis, Z, of the movable threaded element 38. That is, the clamping screw 36 is not in a pre-loaded state under pretension. In the loose or non-tightened condition, a gap 56 having a predetermined distance may exist between the movable threaded element 38 and the top surface of the wall 48 of the cavity 35, as shown in FIG. 5.

Figure 6:
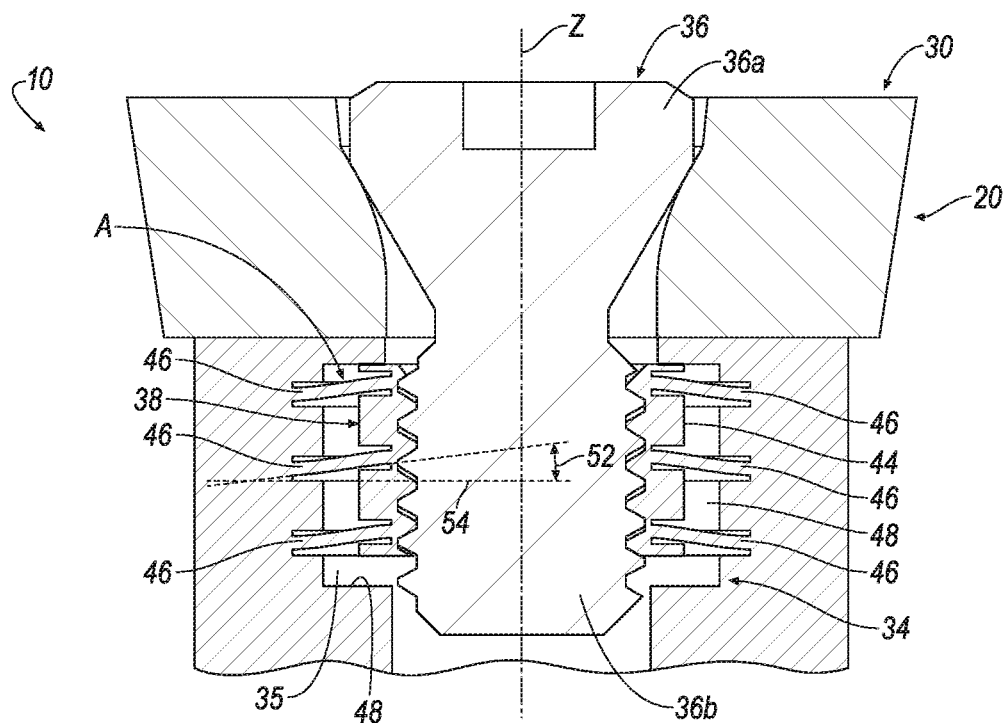
FIG. 6 is a side, cross-sectional view of the movable threaded element with spring-like members of FIG. 3 when in a tightened condition.
Figure 7:
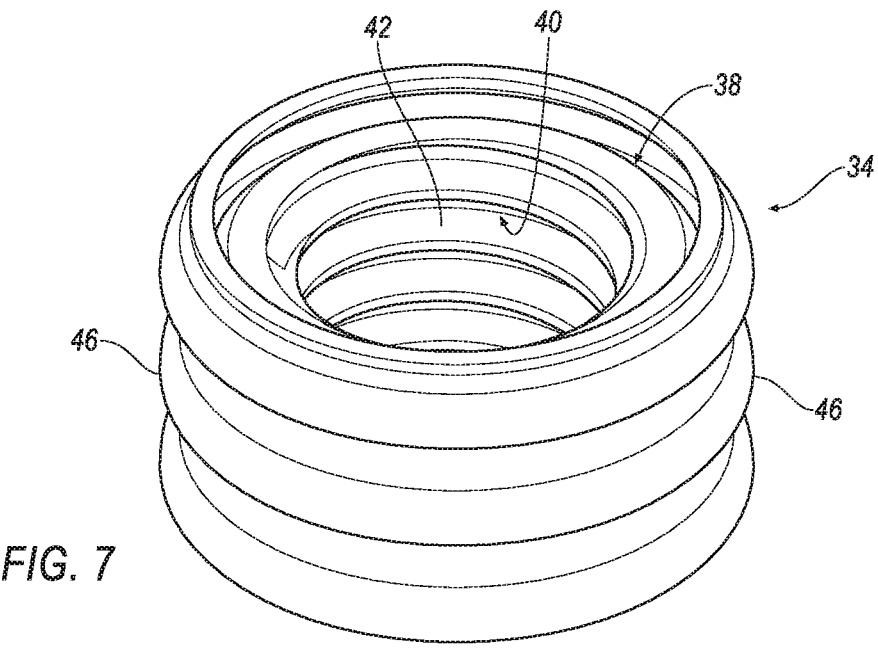
FIG. 7 is an enlarged, isometric top view of a hardware fastener with a movable threaded element and spring-like members that act as a wave spring according to an embodiment of the invention.

FIG. 6 shows the hardware fastener 34 in a tightened condition. This is achieved by rotating the mounting screw 36 in the proper direction, such that the movement of the movable threaded element 38 in the direction of the vertical axis, Z, reduces or closes the distance of the gap 56 when the torque on the mounting screw 36 reaches a desired value. In this condition, the spring-like members 46 are not substantially perpendicular to the vertical axis, Z, of the movable threaded element 38, but are positioned at an angle 52 with respect a plane 54 that is substantially perpendicular to the vertical axis, Z. Now, the threaded fastener 36 is under pretension causing the flexure of the spring-like members 46, thereby placing the clamping screw 36 in a pre-loaded state. As a result, the mounting screw 36 is prevented from becoming loosened due to temperature variations and/or vibrations during a cutting operation.

It will be appreciated that the relative stiffness between the movable threaded element 38 and the cavity 35 of the cutting tool 10 can be selectively adjusted to a desired stiffness in a variety of different ways. As mentioned earlier, one way the relative stiffness can be selectively adjusted is by varying the materials of the movable threaded element 38 and the spring-like members 46. For example, spring-like members made of a material having a greater stiffness, as compared to a different material, will increase the stiffness of the movable threaded element, and vice versa. Another way to selectively adjust the relative stiffness is to vary the dimensions of the spring-like members 46, such as thickness, length, and the like, that are used to suspend the movable threaded element 38 in the cavity 35. For example, spring-like members having a greater thickness will increase the stiffness, and vice versa. Yet another way of selectively adjust the relative stiffness is to vary the number and distribution of the spring like members 46.

It will also be appreciated that the spring-like members 46 of the movable threaded element 38 can be non-perpendicular to the vertical axis, Z, of the movable threaded element 38 when the clamping screw 36 is not in a pre-loaded state under pretension (i.e., in the loose or non-tightened condition), and that the spring-like members 46 of the movable threaded element 38 can be substantially perpendicular to the vertical axis, Z, of the movable threaded element 38 when the clamping screw 36 is in the pre-loaded state under pretension (i.e., in the tightened condition).

One advantage of the invention is that the cutting tool 10 can be placed in the pre-loaded state without the need for a torque wrench to tighten the mounting screw 36 to a predetermined torque value. Another advantage of the invention is that it accommodates temperature variations that may occur during operation. Differences in thermal expansion rates between materials typically used in cutting inserts and mounting screws, such as tungsten carbide and steel, can cause a reduction in screw preload as the temperature increases. To maintain proper preload, the displacement of the movable threaded element 38 must be large enough to compensate for the difference in thermal expansion. As a result, the cutting insert 30 will remain securely mounted in the pocket 20 during variations in temperature experienced by the cutting tool 10.

In the above embodiment, the plurality of spring-like members 46 that are equally spaced in the circumferential direction and are arranged in one or more rows 50 in the axial direction (i.e., in the direction of the Z-axis). However, it should be appreciated that the spring-like members 46 can be arranged in any desirable configuration to provide an area, A, of decreased stiffness between the movable threaded element 38 and the wall 48 of the cavity 35 to allow movement of the movable threaded element 38 in the direction of the Z-axis (i.e., axial direction). Another such configuration is shown in FIGS. 7-10.

Figure 8:
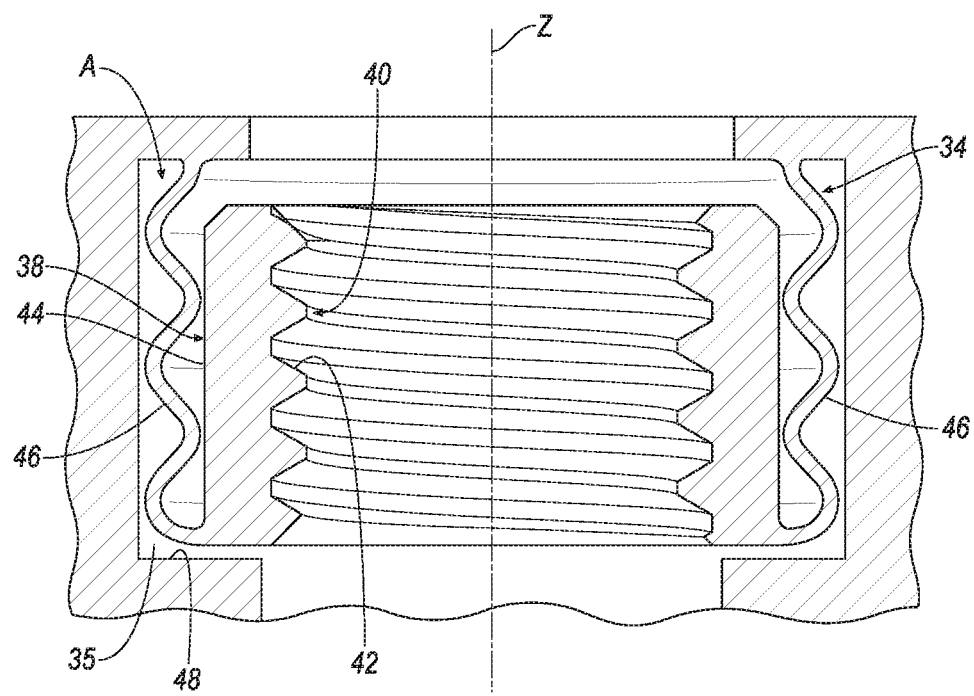
FIG. 8 is an enlarged, cross-sectional view of the hardware fastener with the movable threaded element and the spring-like members of FIG. 7.

In the embodiment shown in FIGS. 7-10, the spring-like members 46 have a different configuration. In the illustrated embodiment, the spring-like member 46 has a single, continuously revolved configuration disposed in the cavity 35 between the movable threaded element 38 and the wall 48 of the cavity 35. The movable threaded element 38 is suspended by the spring-like member 46 in the cavity 35 by attaching the spring-like member 46 to one end of the cavity 35 and to the movable threaded element 38 at an opposite end of the cavity 35, as shown in FIG. 8. In this embodiment, the spring-like member 46 acts as a wave spring that allows the movable threaded element 38 to move a predetermined distance in the direction of the Z-axis (i.e., the axial direction).

Similar to the earlier embodiment, the arrangement shown in FIGS. 7-10 can be made using 3-D printing techniques such that the movable threaded element 38 and the spring-like element 46 are integrally-formed with the cutter body 12.

Figure 9:
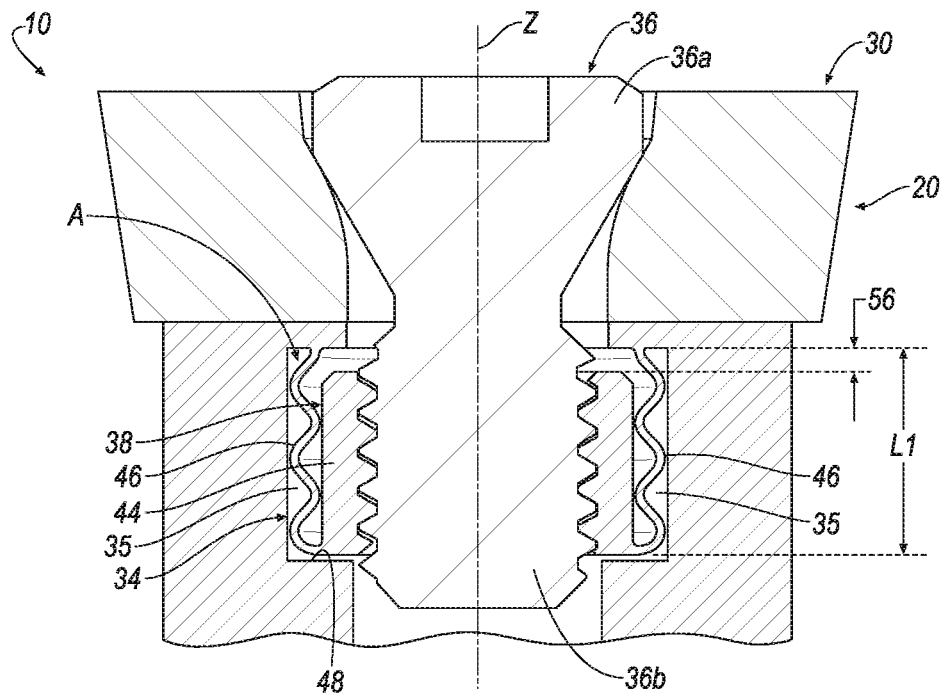
FIG. 9 is a side, cross-sectional view of the movable threaded element with spring-like members of FIG. 7 when in a relaxed or non-tightened condition.

FIG. 9 shows the hardware fastener 34 in a loose or non-tightened condition. In this condition, the cutting insert 30 is not yet securely mounted in the pocket 20 of the slotting cutter 10 and the spring-like member 46 of the movable threaded element 38 is in a relaxed state. That is, the clamping screw 36 is not in a pre-loaded state. In the loose or non-tightened condition, a gap 56 having a predetermined distance exists between the movable threaded element 38 and the wall 48 of the cavity 35, as shown in FIG. 9. In addition, the one or more spring-like elements 46 have a length, L1, with respect to the Z-axis (i.e., the axial direction).

Figure 10:
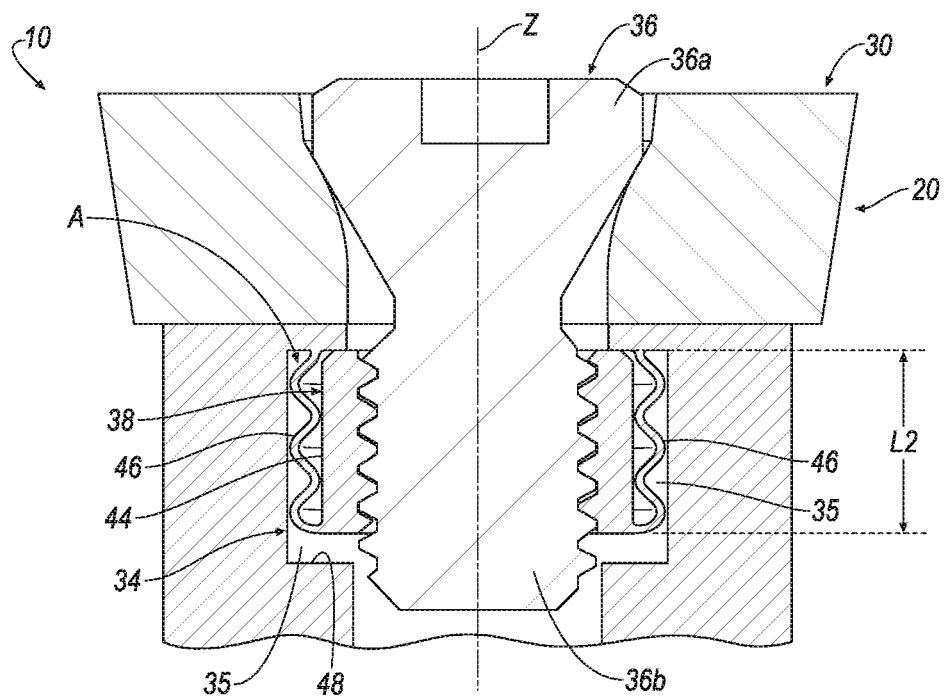
FIG. 10 is a side, cross-sectional view of the movable threaded element with spring-like members of FIG. 7 when in a tightened condition.
Figure 11:
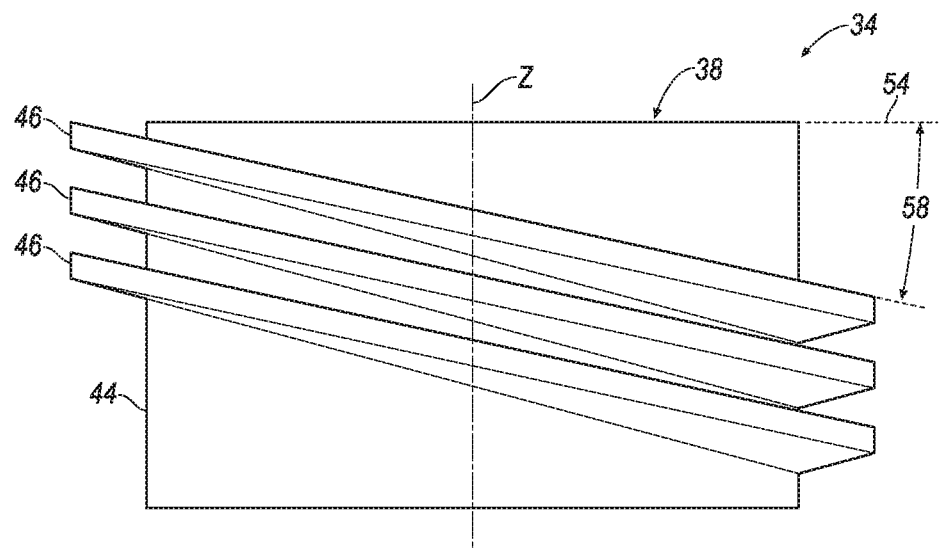
FIG. 11 is an enlarged, isometric top view of a hardware fastener with a movable threaded element and spiral rows of spring-like members that act as a cantilever according to an embodiment of the invention.
Figure 12:
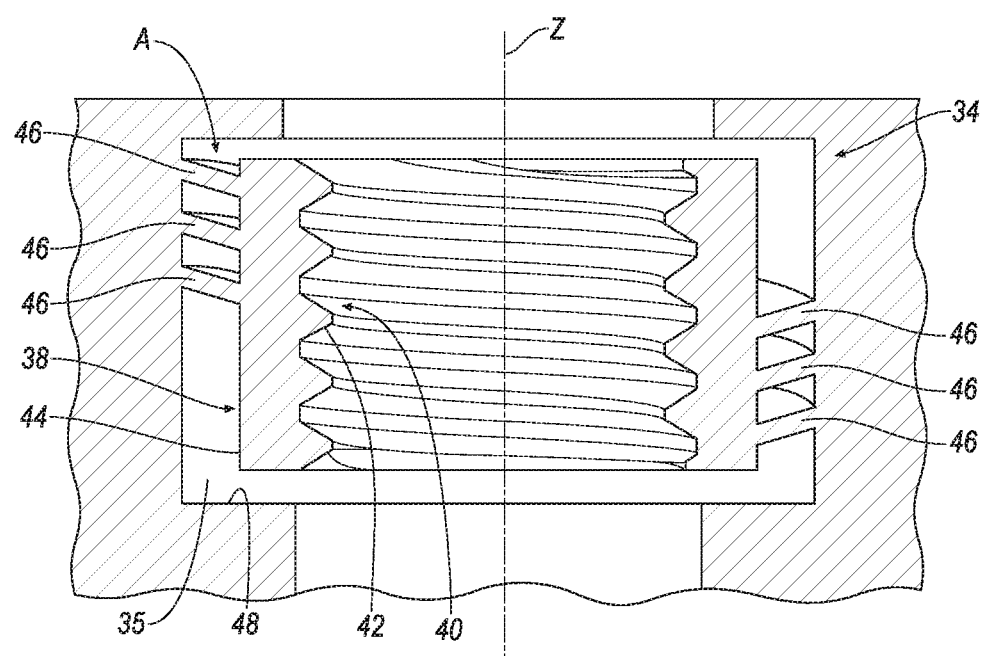
FIG. 12 is an enlarged, side view of the hardware fastener with the movable threaded element and the spring-like members of FIG. 11.

FIG. 10 shows the hardware fastener 34 in a tightened condition. This is achieved by rotating the mounting screw 36 in the proper direction, such that the movement of the movable threaded element 38 in the direction of the vertical axis, Z, would eventually reduce or close the gap 56 when the torque on the mounting screw 36 reaches a desired value. In this condition, the one or more spring-like members 46 are in a compressed state having a length, L2, which is shorter than the length, L1, thereby placing the threaded fastener 36 under pretension in a pre-loaded state. As a result, the cutting insert 30 is prevented from becoming loosened due to temperature variations and/or vibrations during a cutting operation. It will be appreciated that the one or more spring-like member 46 can be in an extensive state in which the length, L2, is greater than the length, L1, to place the threaded fastener 36 under pretension in a pre-loaded state.

Another configuration for the one or more spring-like members 46 is shown in FIGS. 11-14. In this embodiment, the one or more spring-like members 46 extend in a spiral fashion about the exterior surface 44 of the movable threaded element 38, where the spring like member 46 is angled in the fashion of a concave, or non-flat, spring. In other words, the one or more spring-like members 46 do not lie in a plane 54 that is substantially perpendicular to the Z-axis of the movable threaded element 38. Rather, the one or more spring-like members 46 are formed at an angle 58 with respect to the plane 54.

Figure 13:
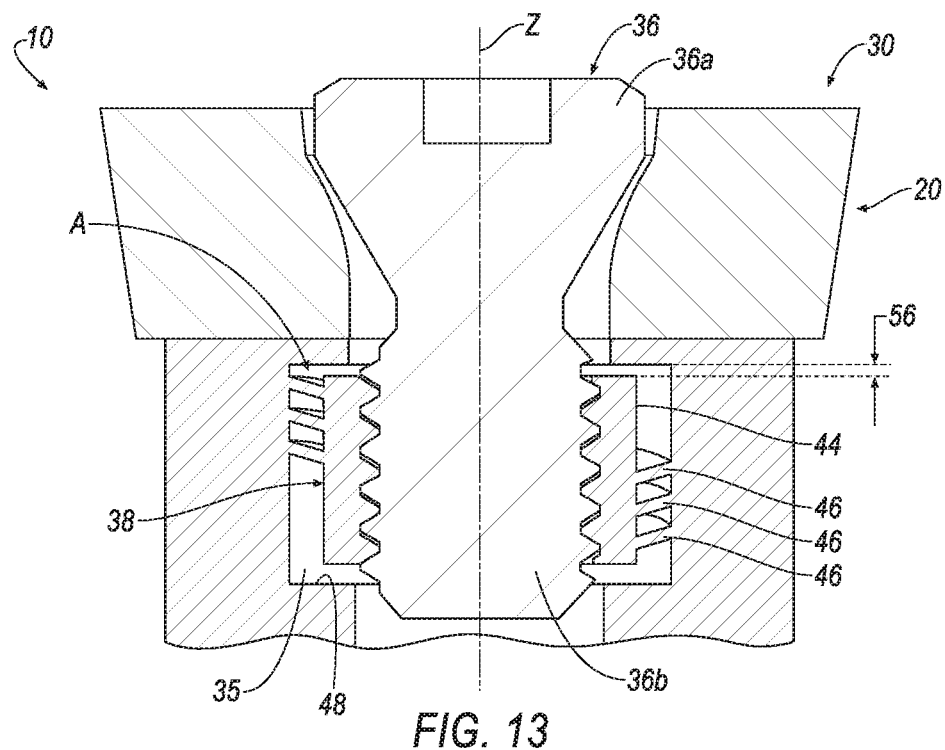
FIG. 13 is a side, cross-sectional view of the movable threaded element with spring-like members of FIG. 11 when in a relaxed or non-tightened condition.

FIG. 13 shows the hardware fastener 34 in a loose or non-tightened condition. In this condition, the cutting insert 30 is not yet securely mounted in the pocket 20 of the slotting cutter 10 and the one or more spring-like members 46 are in a relaxed state. That is, the threaded fastener 36 is not in a pre-loaded state under pretension. In the loose or non-tightened condition, a gap 56 having a predetermined width exists between the movable threaded element 38 and the wall 48 of the cavity 35, as shown in FIG. 13.

Figure 14:
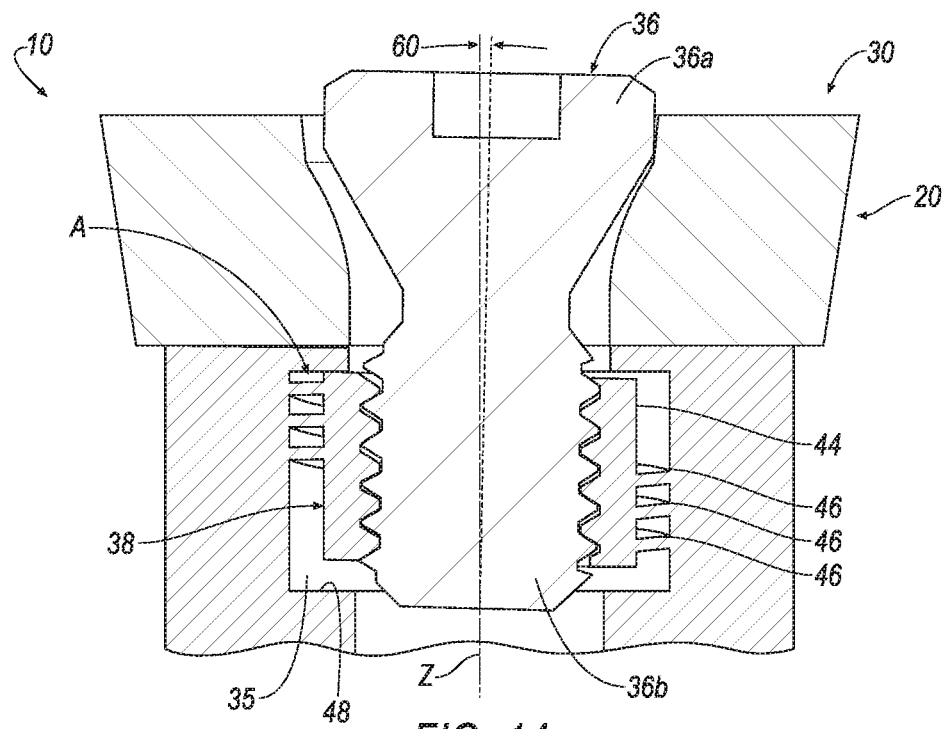
FIG. 14 is a side, cross-sectional view of the movable threaded element with spring-like members of FIG. 11 when in a tightened condition.

FIG. 14 shows the hardware fastener 34 in a tightened condition. This is achieved by rotating the mounting screw 36 in the proper direction, such that the movement of the movable threaded element 38 in the direction of the vertical axis, Z, eventually reduces or closes the gap 56 and the torque on the mounting screw 36 reaches a desired value. In this condition, the one or more spring-like members 46 flex and are not substantially perpendicular to the vertical axis, Z, of the movable threaded element 38, but are positioned at an angle 52 with respect a plane 54 that is substantially perpendicular to the vertical axis, Z. Now, the threaded fastener 36 is under pretension causing the flexure of the spring-like member 46, thereby placing the clamping screw 36 in a pre-loaded state. As a result, the cutting insert 30 is prevented from becoming loosened due to temperature variations and/or vibrations during a cutting operation. In addition, the spring-like members 46 are formed such that the flexure causes the mounting screw 36 to tilt at an angle 60 toward the rear of the insert-receiving pocket 20, thereby pushing the cutting insert 30 rearward in the insert-receiving pocket 20. This tilting toward the rear of the pocket 20 further assists in securely holding the cutting insert 30 in the pocket 20.

Figure 15:
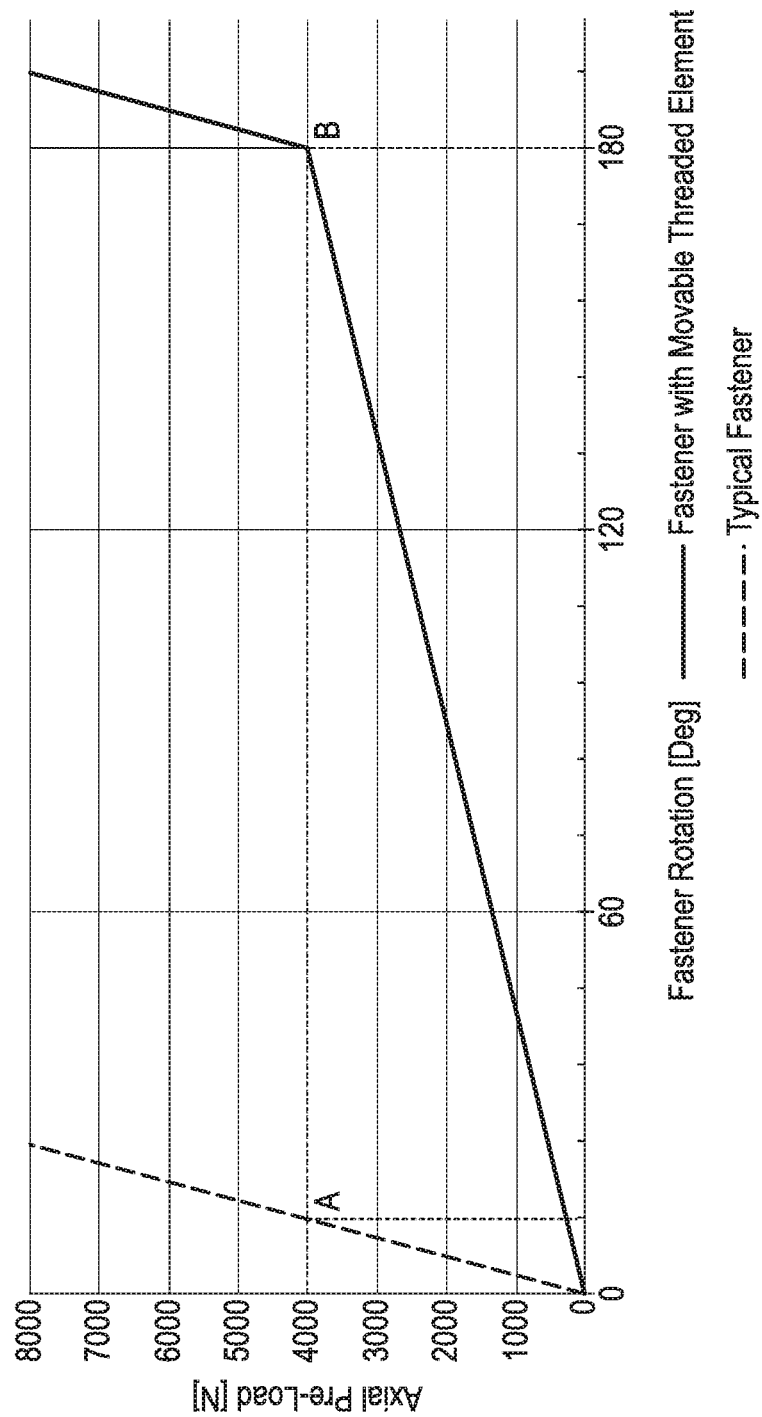
FIG. 15 is a graph representing the amount of axial pre-load generated by the rotation of a conventional fastener and the hardware fastener of the invention.

FIG. 15 represents a graph of the amount of axial pre-load generated by the rotation of a conventional fastener and the hardware fastener of the invention, for example a M4 thread with a pitch of 0.7 mm and unsupported length of 10 mm. For the conventional fastener, to achieve 4000 N of pre-load only 10 degrees of rotation is required (point A). These 10 degrees of rotation causes about 0.02 mm of axial stretch in the screw. In comparison, the hardware fastener with a movable threaded element of the invention, with the same size and pitch, and designed with a 0.35 mm gap between the movable threaded element and the body is also shown. This design would require about 180 degrees of rotation to achieve the same pre-load of 4000 N (point B).

For an application where a steel fastener is being used to hold a carbide insert into a cutting tool, the pre-load will decrease as the temperature of the assembly rises due to the difference in thermal expansion rates of steel and carbide. In the case of the conventional fastener, about 50% of the pre-load would be lost at a temperature increase of about 170° C. For a cutting tool assembly using the hardware fastener with the movable threaded element of the invention, a temperature increase of 170° C. would only reduce the preload by about 3%, which is a significant reduction in the loss of preload as compared to the conventional fastener. As a result, the hardware fastener of the invention acts as a longer fastener with a larger range of angular rotation as compared to the conventional fastener.

The patents and publications referred to herein are hereby incorporated by reference.

Having described presently preferred embodiments the invention may be otherwise embodied within the scope of the appended claims.

What is claimed is:

1. A cutting tool, comprising:
   a body;
   one or more of insert-receiving pockets formed in the body, each pocket capable of receiving a cutting insert, the one or more insert-receiving pockets including a cavity;
   a hardware fastener comprising a movable threaded element suspended within the cavity by one or more spring-like members extending from an exterior surface of the movable threaded element, the movable threaded element having an internal surface with threads for cooperating with a threaded fastener,
   wherein the movable threaded element is suspended in the cavity by the one or more spring-like members such that an area, A, of reduced stiffness is created in the cavity proximate the movable threaded element, thereby allowing the movable threaded element to move a predetermined distance relative to the body within the cavity when torque is applied to the threaded fastener.

2. The cutting tool according to claim 1, wherein the one or more spring-like members act as a cantilever having a predetermined amount of flexure.

3. The cutting tool according to claim 1, wherein the one or more spring-like members act as a wave spring having a predetermined amount of flexure.

4. The cutting tool according to claim 3, wherein the one or more spring-like members having a first length, L1, when the hardware fastener is in a loose or non-tightened condition, and wherein the one or more spring-like members have a second length, L2, which is different than the length, L1, when the hardware fastener is placed in a tightened condition, thereby placing the threaded fastener under pretension in a pre-loaded state.

5. The cutting tool according to claim 1, wherein a gap having a predetermined distance exists between the movable threaded element and the cavity when the hardware fastener is in a loose or non-tightened condition, and wherein the predetermined distance of the gap is reduced when the hardware fastener is placed in a tightened condition.

6. The cutting tool according to claim 5, wherein the gap is closed when the hardware fastener is placed in a tightened condition.

7. The cutting tool according to claim 1, wherein the one or more spring-like members are substantially perpendicular to a vertical axis, Z, of the movable threaded element when the hardware fastener is in a loosened or non-tightened condition, and wherein the spring-like members are not perpendicular to the vertical axis, Z, of the movable threaded element when the hardware fastener is placed in a tightened condition.

8. The cutting tool according to claim 1, wherein the movable threaded element has one or more rows of equally-spaced spring-like members.

9. The cutting tool according to claim 1, wherein the hardware fastener is formed such that flexure of the one or more spring-like members causes the threaded fastener to tilt at an angle toward a rear of the insert-receiving pocket, thereby pushing the cutting insert toward a rear of the insert-receiving pocket.

10. The cutting tool according to claim 1, wherein the hardware fastener is integrally-formed with the insert-receiving pocket of the cutting tool, thereby minimizing manufacturing tolerances and backlash when placing the hardware fastener in a loose or non-tightened condition and a tightened condition.

11. The cutting tool according to claim 10, wherein the hardware fastener is integrally-formed with the insert-receiving pocket of the cutting tool using a 3-D printing technique.

12. The cutting tool according to claim 1, wherein the movable threaded element is connected to a wall of the cavity by the one or more spring-like members.

13. The cutting tool according to claim 1, further comprising a plurality of rows of spring-like members.

14. The cutting tool according to claim 13, wherein each spring-like member of one row is vertically aligned with a respective spring-like member of a different row.

15. The cutting tool according to claim 1, wherein the movable threaded element moves the predetermined distance in a direction of a vertical axis (Z) when torque is applied to the threaded fastener.

* * * * *